(12) United States Patent
Reichman et al.

(10) Patent No.: US 7,481,992 B2
(45) Date of Patent: *Jan. 27, 2009

(54) BASE-FACILITATED REFORMATION REACTIONS OF ORGANIC SUBSTANCES

(75) Inventors: Benjamin Reichman, West Bloomfield, MI (US); William Mays, Commerce, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 605 days.

This patent is subject to a terminal disclaimer.

(21) Appl. No.: 10/763,616

(22) Filed: Jan. 23, 2004

(65) Prior Publication Data

US 2004/0156777 A1 Aug. 12, 2004

Related U.S. Application Data

(63) Continuation-in-part of application No. 10/636,093, filed on Aug. 7, 2003, now Pat. No. 6,994,839, and a continuation-in-part of application No. 10/321,935, filed on Dec. 17, 2002, now Pat. No. 6,890,419, said application No. 10/636,093 is a continuation-in-part of application No. 09/929,940, filed on Aug. 15, 2001, now Pat. No. 6,607,707.

(51) Int. Cl.
*C01B 3/22* (2006.01)
*C01B 3/24* (2006.01)

(52) U.S. Cl. .............. 423/648.1; 423/419.1; 423/421; 423/422; 423/650; 423/652

(58) Field of Classification Search ........... 423/648.1, 423/650, 651, 652, 419.1, 421, 422
See application file for complete search history.

(56) References Cited

U.S. PATENT DOCUMENTS

| | | | | |
|---|---|---|---|---|
| 3,252,774 A | * | 5/1966 | McMahon et al. | 48/214 R |
| 3,786,138 A | * | 1/1974 | Shalit et al. | 423/650 |
| 4,676,972 A | * | 6/1987 | Velenyi et al. | 423/418.2 |
| 6,596,423 B2 | * | 7/2003 | Mahajan | 429/17 |
| 6,607,707 B2 | | 8/2003 | Reichman | |
| 6,699,457 B2 | * | 3/2004 | Cortright et al. | 423/648.1 |
| 6,890,419 B2 | * | 5/2005 | Reichman et al. | 205/637 |
| 6,964,757 B2 | * | 11/2005 | Cortright et al. | 423/648.1 |
| 6,964,758 B2 | * | 11/2005 | Cortright et al. | 423/648.1 |
| 6,994,839 B2 | * | 2/2006 | Reichman et al. | 423/648.1 |
| 7,022,306 B1 | * | 4/2006 | Oroskar et al. | 423/648.1 |

* cited by examiner

*Primary Examiner*—Wayne Langel
(74) *Attorney, Agent, or Firm*—David W. Schumake

(57) ABSTRACT

A base-facilitated reformation reaction. Hydrogen is produced from a reaction of an organic substance with a base to form bicarbonate ion or carbonate ion as a by-product. The base-facilitated reformation reactions are thermodynamically more spontaneous than conventional reformation reactions and are able to produce hydrogen gas at less extreme reaction conditions than conventional reformation reactions. In one embodiment, the instant base-facilitated reactions produce hydrogen gas from an organic substance at a lower temperature than is possible for the production of hydrogen gas from the organic substance in a conventional reformation reaction. In another embodiment, the instant base-facilitated reformation reactions produce hydrogen gas from an organic substance at a faster rate at a particular temperature than is possible from the conventional reformation reaction of the organic substance. In yet another embodiment, a reformation reaction is made spontaneous in the liquid phase by running the reaction at an elevated pressure. The preferred organic substances of the instant invention are hydrocarbons having four or more carbon atoms per molecule or mixtures thereof that are available from fuels such as gasoline, bio-diesel, diesel or other petroleum distillates or by-products.

40 Claims, No Drawings

BASE-FACILITATED REFORMATION REACTIONS OF ORGANIC SUBSTANCES

CROSS-REFERENCE TO RELATED APPLICATIONS

This application is a continuation-in-part of application Ser. No. 10/636,093, entitled "Carbonate Recycling in a Hydrogen Producing Reaction", filed Aug. 7, 2003 now U.S. Pat. No. 6,994,839, the disclosure of which is herein incorporated by reference, and a continuation-in-part of application Ser. No. 10/321,935, entitled "Electrolytic Production of Hydrogen", filed Dec. 17, 2002 now U.S. Pat. No. 6,890,419, the disclosure of which is herein incorporated by reference. Application Ser. No. 10/636,093 is a continuation-in-part of application Ser. No. 09/929,940, filed Aug. 15, 2001, now U.S. Pat. No. 6,607,707.

FIELD OF INVENTION

This invention relates to processes for forming hydrogen gas. More particularly, this invention relates to the production of hydrogen gas from organic substances through chemical or electrochemical reactions. Most particularly, the instant invention relates to the production of hydrogen gas through reactions of hydrocarbons in the presence of a base and/or under high pressure conditions.

BACKGROUND OF THE INVENTION

Modern societies are critically dependent on energy to maintain their standards of living and economic viabilities. All aspects of modern life, ranging from the generation of electricity to the powering of automobiles, require the consumption of energy. Conventional fossil fuels are primarily used to meet the energy needs of today's societies. As more societies modernize and existing modern societies expand, the consumption of energy continues to increase at ever growing rates. The increased worldwide use of fossil fuels is creating a number of problems. First, fossil fuels are a finite resource and concern is growing that fossil fuels will become fully depleted in the foreseeable future. Scarcity raises the possibility that escalating costs could destabilize economies as well as the likelihood that nations will go to war over the remaining reserves. Second, fossil fuels are highly polluting. The greater combustion of fossil fuels has prompted recognition of global warming and the dangers it poses to the stability of the earth's ecosystem. In addition to greenhouse gases, the combustion of fossil fuels produces soot and other pollutants that are injurious to humans and animals. In order to prevent the increasingly deleterious effects of fossil fuels, new energy sources are needed.

The desired attributes of a new fuel or energy source include low cost, plentiful supply, renewability, safety, and environmental compatibility. Hydrogen is currently the best prospect for these desired attributes and offers the potential to greatly reduce our dependence on conventional fossil fuels. Hydrogen is the most ubiquitous element in the universe and, if realized, offers an inexhaustible fuel source to meet the increasing energy demands of the world. Hydrogen is available from a variety of sources including coal, natural gas, hydrocarbons in general, organic materials, inorganic hydrides and water. These sources are geographically well distributed around the world and accessible to most of the world's population without the need to import. In addition to being plentiful and widely available, hydrogen is also a clean fuel source. Combustion of hydrogen produces water as a by-product. Utilization of hydrogen as a fuel source thus avoids the unwanted generation of the carbon and nitrogen based greenhouse gases that are responsible for global warming as well as the unwanted production of soot and other carbon based pollutants in industrial manufacturing. Hydrogen truly is a green energy source.

The realization of hydrogen as a ubiquitous source of energy ultimately depends on its economic feasibility. Economically viable methods for producing hydrogen as well as efficient means for storing, transferring, and consuming hydrogen, are needed. Chemical and electrochemical methods have been proposed for the production of hydrogen. The most readily available chemical feedstocks for hydrogen are organic compounds, primarily hydrocarbons and oxygenated hydrocarbons. Common methods for obtaining hydrogen from hydrocarbons and oxygenated hydrocarbons are dehydrogenation reactions and oxidation reactions.

Steam reformation and the electrochemical generation of hydrogen from water through electrolysis are two common strategies currently used for producing hydrogen. Both strategies, however, suffer from drawbacks that limit their practical application and/or cost effectiveness. Steam reformation reactions are endothermic at room temperature and therefore require heating. Temperatures of several hundred degrees are generally needed to realize acceptable reaction rates. These temperatures are costly to provide, impose special requirements on the materials used to construct the reactors, and limit the range of applications. Steam reformation reactions also occur in the gas phase, which means that hydrogen must be recovered from a mixture of gases through a separation process that adds cost and complexity to the reformation process. Steam reformation also leads to the production of the undesirable greenhouse gases $CO_2$ and/or $CO$ as by-products. Water electrolysis has not been widely used in practice because high expenditures of electrical energy are required to effect water electrolysis. The water electrolysis reaction requires a high minimum voltage to initiate and an even higher voltage to achieve practical rates of hydrogen production. The high voltage leads to high electrical energy costs for the water electrolysis reaction and has inhibited its widespread use.

In U.S. Pat. No. 6,607,707 (the '707 patent), the disclosure of which is incorporated by reference herein, the instant inventors considered the production of hydrogen from hydrocarbons and oxygenated hydrocarbons through reactions of hydrocarbons and oxygenated hydrocarbons with a base. Using a thermodynamic analysis, the instant inventors determined that reactions of many hydrocarbons and oxygenated hydrocarbons react spontaneously with a base or basic aqueous solution to form hydrogen gas at particular reaction conditions, while the same hydrocarbons and oxygenated hydrocarbons react non-spontaneously in conventional steam reformation processes at the same reaction conditions. Inclusion of a base was thus shown to facilitate the formation of hydrogen from many hydrocarbons and oxygenated hydrocarbons and enabled the production of hydrogen at less extreme conditions than those normally encountered in steam reformation reactions, thereby improving the cost effectiveness of producing hydrogen gas. In many reactions, the processes of the '707 patent led to the formation of hydrogen gas from a liquid phase reaction mixture, in some cases at room temperature, where hydrogen was the only gaseous product and thus was readily recoverable without the need for a gas phase separation step. The reactions of the '707 patent further operate through the formation of carbonate ion or bicarbonate ion and avoid the production of the greenhouse gases $CO$ and $CO_2$. Inclusion of a base creates a new reaction pathway for the formation of hydrogen gas with thermodynamic benefits that allow for the production of hydrogen gas at lower temperatures than are needed for corresponding steam reformation processes.

In co-pending U.S. patent application Ser. No. 10/321,935 (the '935 application), the instant inventors considered electrochemical methods to promote the production of hydrogen from organic substances in the presence of water (or acidic solution) and/or a base. They showed that electrochemical reactions of organic substances with water to produce hydrogen require lower electrochemical cell voltages than water electrolysis. They also showed that electrochemical reactions of organic substances in the presence of an acid or base require low electrochemical cell voltages at room temperature. In some embodiments, hydrogen production reactions of organic substances were shown to occur at room temperature in an electrochemical reaction and were accelerated by heating. In other embodiments, hydrogen production reactions of organic substances were shown to occur spontaneously at room temperature without applying a voltage and were accelerated by providing a voltage.

In co-pending U.S. patent application Ser. No. 10/636,093 (the '093 application), the instant inventors recognized that the realization of the beneficial properties of the reactions described in the '707 patent and the co-pending '935 application requires a system level consideration of the costs and overall efficiency of the reactions. In addition to energy inputs and raw materials, consideration of the disposal or utilization of by-products must be made. Of particular importance is consideration of the dispensation of the carbonate and bicarbonate ion products of the disclosed hydrogen producing reactions. In the co-pending '093 application, the instant inventors describe strategies for the recycling of the carbonate and bicarbonate ions. A carbonate recycle process was described that includes a first step in which carbonate ion is reacted with a metal hydroxide to form a soluble metal hydroxide and a weakly soluble or insoluble carbonate salt. The soluble metal hydroxide may be returned to the hydrogen producing reaction as a base reactant for further production of hydrogen. In a second step, the carbonate salt is thermally decomposed to produce a metal oxide and carbon dioxide. In a third step, the metal oxide is reacted with water to reform the metal hydroxide used in the first step. The carbonate recycle process is thus sustainable with respect to the metal hydroxide and the overall hydrogen producing process is sustainable with respect to the base through the carbonate recycling process of the '093 application. Bicarbonate by-products of hydrogen producing reactions of organic substances with bases can be similarly recycled according to the '093 application by first converting a bicarbonate by-product to a carbonate and then recycling the carbonate.

The hydrogen producing reactions of the '707 patent and '935 application optionally along with the recycling processes of the '093 application provide for an efficient, environmentally friendly method for generating the hydrogen needed for the advancement of a hydrogen based economy. There is a need to further extend the range of applicability of the hydrogen producing reactions of the '707 patent and '935 application. Of particular interest is consideration of the range of starting materials that may be used in the reactions and the suitability of commonly available organic substances for use as reactants. Also of interest is the range of viable reaction conditions that are conducive to the formation of hydrogen gas and optimization of reaction conditions with respect to trade-offs that may be present between reaction efficiency, reaction rate and process cost.

SUMMARY OF THE INVENTION

The instant invention provides a process for producing hydrogen gas from chemical or electrochemical reactions of organic substances or mixtures thereof with bases in which carbonate and/or bicarbonate ion is produced as a by-product. The instant process optionally includes a carbonate ion recycle process in which the carbonate ion by-product is transformed to a base that can subsequently be further reacted with an organic substance or mixture thereof to produce hydrogen gas.

The instant base-facilitated reformation reactions improve the thermodynamic spontaneity of producing hydrogen gas from an organic substance or mixture thereof relative to the production of hydrogen gas through the conventional reformation of the organic substance or mixture thereof. In one embodiment, the greater thermodynamic spontaneity permits the production of hydrogen gas through the instant base-facilitated reactions of an organic substance or mixture thereof at temperatures that are lower than those needed to produce hydrogen gas from the organic substance or mixture thereof in a conventional reformation reaction. In another embodiment, the greater thermodynamic spontaneity permits the production of hydrogen gas from an organic substance or mixture thereof at a faster rate at a particular temperature in a base-facilitated reaction than in a conventional reformation reaction of the organic substance or mixture thereof at the particular temperature.

In another embodiment, reaction pressure is increased to permit reformation reactions to occur in the liquid phase at elevated temperatures. This embodiment permits the realization of the faster reactions possible through the use of elevated temperatures while maintaining a liquid phase reaction environment. In this embodiment, the hydrogen produced in the instant base-facilitated reactions remains the only gas phase species present and is therefore readily obtained in a substantially pure form.

In one embodiment, hydrogen is produced from reactions of one or more hydrocarbons with a base. The preferred hydrocarbons are petroleum components or mixtures thereof and include commonly available fuels such as gasoline, diesel, kerosene, other petroleum distillates or distillates or components of any of the foregoing. In this embodiment, attainment of reasonable reaction rates may require temperatures well above room temperature as well as reactions in the gas phase. The instant base facilitated hydrogen producing reactions remain advantageous under these conditions as hydrogen can be produced at a lower temperature or faster rate in a base-facilitated reaction relative to a conventional reformation reaction.

In other embodiments, reaction rates are increased through increases in reaction temperature. In these embodiments, the reaction temperature is sufficiently high that bases in a solid or molten state may be used as reactants in the instant hydrogen producing reactions.

DETAILED DESCRIPTION OF THE ILLUSTRATED EMBODIMENTS

The instant invention is concerned with an extension of the chemical and electrochemical hydrogen producing reactions described in U.S. Pat. No. 6,607,707 (the '707 patent) and U.S. patent application Ser. No. 10/321,935 (the '935 application). The instant invention in particular provides for the production of hydrogen from additional organic substances, mixtures of organic substances and further considers the range of reaction conditions and suitable physical states of reactants and products in the context of the chemical and electrochemical hydrogen producing reactions described generally in the '707 patent and '935 application. In a preferred embodiment, hydrogen is produced from a hydrocarbon or hydrocarbon mixture in a base-facilitated reformation reaction that proceeds through a carbonate ion or a bicarbonate ion by-product.

The hydrogen producing reactions of the instant invention include the reaction of organic substances such as hydrocarbons and oxygenated hydrocarbons with a base. In some embodiments, the base-facilitated reformation reaction is completed at an elevated reaction temperature. In other embodiments, the base-facilitated reformation reaction is completed at an elevated reaction pressure. In still other embodiments, the base-facilitated reformation reaction is completed at elevated temperature and elevated pressure. As discussed in the '707 patent and the '935 application, reactions of organic substances with a base permit the production of hydrogen gas through the formation of carbonate ion and/or bicarbonate ion by-products. Inclusion of a base as a reactant in the production of hydrogen from organic substances thus provides an alternative reaction pathway relative to conventional reformation reactions of organic substances, which proceed through a reaction pathway that leads to the production of $CO_2$ from a reaction of an organic substance with water. A reaction of an organic substance or mixture of organic substances with a base to produce hydrogen according to the instant invention may be referred to herein as a base-facilitated reformation reaction.

The alternative reaction pathway of the instant base-facilitated reformation reactions of organic substances or mixtures or organic substances leads to a more spontaneous (or less non-spontaneous) reaction at a particular set of reaction conditions relative to a conventional reformation reaction of the organic substance or mixture of organic substances. For illustration purposes, a comparative example involving an oxygenated hydrocarbon from the '707 patent may be considered. The production of hydrogen from ethanol may occur through the following reactions (1), (2) or (3):

| | $\Delta G^0_{rxn}$ (cal/mol) |
|---|---|
| (1) $C_2H_5OH_{(l)} + 3H_2O_{(l)} \leftrightarrows 6H_{2(g)} + 2CO_{2(g)}$ | 23,950 |
| (2) $C_2H_5OH_{(l)} + 2OH^-_{(aq)} + 3H_2O_{(l)} \leftrightarrows 6H_{2(g)} + 2HCO_3^-_{(aq)}$ | 7,040 |
| (3) $C_2H_5OH_{(l)} + 4OH^-_{(aq)} + H_2O_{(l)} \leftrightarrows 6H_{2(g)} + 2CO_3^{2-}_{(aq)}$ | −2,970 |

Reaction (1) is the conventional reformation reaction of ethanol and reactions (2) and (3) are base-facilitated reformation reactions according to the instant invention. In reactions (2) and (3), the hydroxide ion ($OH^-$) reactant is provided by a base. Reactions (2) and (3) differ with respect to the relative amounts of hydroxide ion and ethanol. Reaction (2) includes a lower amount of base and proceeds through a bicarbonate ion ($HCO_3^-$) by-product, while reaction (3) includes a higher amount of base and proceeds through a carbonate ion ($CO_3^-$) by-product.

$\Delta G^0_{rxn}$ is the Gibbs free energy of reaction for each of the reactions at standard conditions (25° C., 1 atm. and unit activity of reactants and products). The Gibbs free energy is an indicator of the thermodynamic spontaneity of a chemical reaction. Spontaneous reactions have negative values for the Gibbs free energy, while non-spontaneous reactions have positive values for the Gibbs free energy. A spontaneous reaction is a reaction that proceeds without the additional input of energy at a particular set of reaction conditions. Reaction conditions such as reaction temperature, reaction pressure, concentration etc. may influence the value of the Gibbs free energy. A reaction that is non-spontaneous at one set of conditions may become spontaneous at another set of conditions. The magnitude of the Gibbs free energy is an indicator of the degree of spontaneity of a reaction. The more negative (or less positive) the Gibbs free energy is, the more spontaneous is the reaction.

The reformation reaction (1) above is a non-spontaneous reaction at standard conditions. The base-facilitated reformation reaction (2) is also non-spontaneous, but is more spontaneous than reaction (1) (and would become spontaneous at a lower temperature than reaction (1)). Inclusion of a base creates a reaction pathway for the production of hydrogen from ethanol in a base-facilitated reaction that is less non-spontaneous than the production of hydrogen from the conventional reformation reaction of ethanol. Further addition of base leads to a further decrease in the Gibbs free energy and ultimately provides a spontaneous reaction at standard conditions as exemplified by reaction (3) above. The ability of a base to improve the thermodynamic spontaneity of the production of hydrogen from organic substances is an important beneficial feature of the instant hydrogen producing reactions. The greater thermodynamic spontaneity may enable the spontaneous production of hydrogen from an organic substance at a particular set of reaction conditions in a base-facilitated reformation reaction where the conventional reformation reaction at the same conditions is non-spontaneous and therefore unable to produce hydrogen spontaneously.

The instant invention generally is concerned with the production of hydrogen from organic substances or mixtures of organic substances in a base-facilitated reformation reaction. More specifically, the instant invention demonstrates the feasibility of using a base to improve the thermodynamic spontaneity of producing hydrogen from organic substances and mixtures of organic substances. Of particular interest to the instant inventors is the production of hydrogen from commonly available fuels such as gasoline, diesel, jet fuel, kerosene, other petroleum distillates and petroleum by-products as well as distillates and components of any of the foregoing. Also of interest to the instant inventors is the production of hydrogen gas from organic substances, individually or in combination, present in the foregoing and other commonly available fuels. The instant inventors recognize that the goal of obtaining hydrogen in a cost effective fashion is aided by the use of raw materials or feedstocks that are currently available and efficiently produced in large volumes. Organic substances derived from petroleum or petroleum distillates are among the most widely available and cost effective reactants for reformation reactions. The instant inventors have accordingly demonstrated herein that the base-facilitated production of hydrogen as described in the '707 patent is readily extended to hydrocarbons and hydrocarbon mixtures derived from petroleum feedstocks, other natural organic sources and other commonly available organic feedstocks or raw materials including single components and mixtures.

In a preferred embodiment, the organic substances in the context of the instant invention are hydrocarbons or oxygenated hydrocarbons having two or more carbons per molecule and mixtures thereof. In another preferred embodiment, the organic substances are hydrocarbons or oxygenated hydrocarbons having four or more carbons per molecule and mixtures thereof. In yet another preferred embodiment, the organic substances are hydrocarbons or oxygenated hydrocarbons having five or more carbons per molecule and mixtures thereof. In still another preferred embodiment, the organic substances are hydrocarbons or oxygenated hydrocarbons having six or more carbons per molecule and mixtures thereof. The hydrocarbons include alkanes (e.g., butane, pentane, hexane, heptane, octane, dodecane, tetradecane), alkenes (e.g. ethylene, propylene, butene), alkynes (e.g. acetylene) or aromatics (e.g. benzene and substituted benzenes). Oxygenated hydrocarbons include alcohols, ethers, carboxylic acids, and aldehydes. Straight chain, branched and cyclic hydrocarbons and oxygenated hydrocarbons are among the organic substances suitable for use as reactants in the instant base-facilitated reformation reactions; thus organic substances that are straight chained compounds, branched compounds or cyclic compounds are within the scope of the instant invention. Preferred organic substances are those available in large quantity at reasonable cost and include the components of fuels such as gasoline or a distillate thereof, diesel or a distillate thereof, bio-diesel or a distillate thereof, kerosene or a distillate thereof, naphtha or a distillate thereof, other petroleum distillates, other petroleum by-products and bio-mass. In another preferred embodiment, mixtures of two or more of the foregoing organic substances are reacted to form hydrogen gas according to the instant base-facilitated reformation reactions. Mixtures suitable for the instant invention include mixtures of two or more hydrocarbons, mixtures of two or more oxygenated hydrocarbons and mixtures including one or more hydrocarbons and one or more oxygenated hydrocarbons.

Gasoline is representative of many commonly available fuels and can be discussed as an example of a feedstock in accordance with the instant method for producing hydrogen. Gasoline is formed from crude oil through a distillation process and is one of several crude oil distillates that is used as a fuel. Gasoline has a complex formulation that includes over 500 hydrocarbons among its components as well as additives and oxygenates that are often mandated by law to minimize the harmful environmental effects of combustion. Although the precise formulation of gasoline is typically proprietary, the hydrocarbon components of gasoline are generally consistent and dictated by the composition of crude oil. The components of gasoline include alkanes (normal, branched, and cyclo alkanes), aromatics and olefins. The alkane and olefin components of gasoline predominantly includes compounds having a number of carbons ranging from four to twelve per molecule, inclusive and may be straight chain, branched, or cyclic and the aromatic content of gasoline predominantly includes benzene and substituted benzenes. A typical gasoline might include 15% normal alkanes, 30% isoalkanes, 12% cycloalkanes, 35% aromatics and 8% olefins.

The most abundant normal alkane components of gasoline include n-butane ($C_4H_{10}$), n-pentane ($C_5H_{12}$), n-hexane ($C_6H_{14}$), n-heptane ($C_7H_{16}$), and n-octane ($C_8H_{18}$) with lesser amounts of normal alkanes having 9 or more carbon atoms. The most abundant branched alkanes include 2-methyl propane, 2-methyl butane, 2-methyl pentane, 3-methyl pentane, 2-methyl hexane, 3-methyl hexane, 2,2-dimethylpentane, 2,2,3-trimethylbutane, and 2,2,4-trimethylpentane. The most abundant cycloalkanes include cyclopentane, methylcyclopentane, cyclohexane, and methylcyclohexane. The most abundant aromatics in gasoline include benzene, toluene, ethyl benzene, xylene (ortho, meta and para), 3-ethyltoluene, 1,3,5-trimethylbenzene, and 1,2,4-trimethylbenzene. The most abundant olefins in gasoline include 2-pentene, 2-methylbutene, 2-methylpentene, and cyclopentene. Any of the foregoing components of gasoline and related organic substances are suitable reactants in the instant base-facilitated reformation reactions.

In the context of the instant invention, straight chain and branched alkanes having the chemical formula $C_nH_{2n+2}$ react with a base in a base-facilitated reformation according to the following reactions:

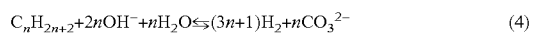

$$C_nH_{2n+2} + 2nOH^- + nH_2O \leftrightarrows (3n+1)H_2 + nCO_3^{2-} \qquad (4)$$

$$C_nH_{2n+2} + nOH^- + 2nH_2O \leftrightarrows (3n+1)H_2 + nHCO_3^- \qquad (5)$$

where n is an integer. In these reactions, the hydroxide ion is provided by a base. The two base-facilitated reformation reaction (4) and (5) differ in the relative proportions of base and hydrocarbon used in the reaction. Depending on the amount of base used, either reaction may occur independent of the other or both reactions may occur simultaneously. The base-facilitated reformation reaction (4) is favored at high base concentrations and proceeds through the formation of a carbonate ion by-product. The base-facilitated reaction (5) is favored at low base concentrations and proceeds through the formation of a bicarbonate ion by-product. The corresponding conventional reformation reaction is not base-facilitated and occurs via a reaction with water (steam) through the formation of carbon dioxide as shown in the following reaction (6):

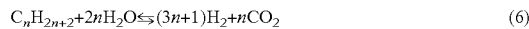

$$C_nH_{2n+2} + 2nH_2O \leftrightarrows (3n+1)H_2 + nCO_2 \qquad (6)$$

An assessment of the effectiveness of the base-facilitated reformation reactions (4) and (5) relative to the conventional reformation reaction (6) can be made through a thermodynamic spontaneity analysis using specific hydrocarbon embodiments. The spontaneity analysis is based on evaluating the Gibbs free energy of the base-facilitated reformation reactions relative to the Gibbs free energy of the conventional reformation reaction. An example of the thermodynamic spontaneity analysis has been described hereinabove and additional information is available in the '707 patent and the '935 application.

The instant inventors now demonstrate improved thermodynamic spontaneity of selected hydrocarbons in base-facilitated reformation reactions relative to conventional reformation reactions. One common component of gasoline is liquid phase n-heptane (n-$C_7H_{16}$). The conventional and two base-facilitated reformation reactions of liquid phase n-heptane are given in reactions (7)-(9) below along with the standard Gibbs free of reaction for each reaction:

| | | $\Delta G^0_{rxn}$ (kJ/mol) |
|---|---|---|
| (7) | $C_7H_{16(l)} + 14H_2O_{(l)} \leftrightarrows 22H_{2(g)} + 7CO_{2(g)}$ | 558.3 |
| (8) | $C_7H_{16(l)} + 7OH^-_{(aq)} + 14H_2O_{(l)} \leftrightarrows 22H_{2(g)} + 7HCO_3^-_{(aq)}$ | 312.11 |
| (9) | $C_7H_{16(l)} + 14OH^-_{(aq)} + 7H_2O_{(l)} \leftrightarrows 22H_{2(g)} + 7CO_3^{2-}_{(aq)}$ | 165.6 |

Reaction (7) is the conventional reformation reaction of n-heptane and reactions (8) and (9) are base-facilitated reformation reactions of n-heptane. In reactions (8) and (9), the hydroxide ion reactant is provided by a base. Another component of gasoline is liquid phase n-octane (n-$C_8H_{18}$). The conventional and two base-facilitated reformation reactions of liquid phase n-octane are given in reactions (10)-(12) below along with the standard Gibbs free of reaction for each reaction:

|  | $\Delta G^0_{rxn}$ (kJ/mol) |
|---|---|
| (10) $C_8H_{18(l)} + 16H_2O_{(l)} \leftrightarrows 25H_{2(g)} + 8CO_{2(g)}$ | 632.8 |
| (11) $C_8H_{18(l)} + 8OH^-_{(aq)} + 16H_2O_{(l)} \leftrightarrows 25H_{2(g)} + 8HCO_3^-_{(aq)}$ | 351.44 |
| (12) $C_8H_{18(l)} + 16OH^-_{(aq)} + 8H_2O_{(l)} \leftrightarrows 25H_{2(g)} + 8CO_3^{2-}_{(aq)}$ | 184.0 |

Reaction (10) is the conventional reformation reaction of n-octane and reactions (11) and (12) are base-facilitated reformation reactions of n-octane. In reactions (11) and (12), the hydroxide ion reactant is provided by a base. Yet another component of gasoline is cyclohexane ($C_6H_{12}$). The conventional and two base-facilitated reformation reactions of liquid phase cyclohexane are given in reactions (13)-(15) below along with the standard Gibbs free of reaction for each reaction:

|  | $\Delta G^0_{rxn}$ (kJ/mol) |
|---|---|
| (13) $C_6H_{12(l)} + 12H_2O_{(l)} \leftrightarrows 18H_{2(g)} + 6CO_{2(g)}$ | 452.6 |
| (14) $C_6H_{12(l)} + 6OH^-_{(aq)} + 12H_2O_{(l)} \leftrightarrows 18H_{2(g)} + 6HCO_3^-_{(aq)}$ | 241.58 |
| (15) $C_6H_{12(l)} + 12OH^-_{(aq)} + 6H_2O_{(l)} \leftrightarrows 18H_{2(g)} + 6CO_3^{2-}_{(aq)}$ | 116.0 |

Reaction (13) is the conventional reformation reaction of cyclohexane and reactions (14) and (15) are base-facilitated reformation reactions of cyclohexane. In reactions (14) and (15), the hydroxide ion reactant is provided by a base.

The thermodynamic analysis of the three hydrocarbons presented in the foregoing examples indicates that the conventional and base-facilitated reformation reactions of each of the three hydrocarbons are non-spontaneous, but that the base-facilitated reactions are more spontaneous (less non-spontaneous) than the conventional reformation reaction for each hydrocarbon at standard conditions. The greater spontaneity of the base-facilitated reactions has practical effect in that even though the reactions are not spontaneous at standard conditions, the deviations from standard conditions necessary to render the reactions spontaneous is less extreme for the base-facilitated reactions relative to the conventional reformation reaction of each compound.

The spontaneity of a reaction varies with reaction conditions. Reaction parameters such as the temperature, pressure, species concentration etc. of a reaction influence the Gibbs energy of a reaction and accordingly influence reaction spontaneity. Reactions that are non-spontaneous under one set of conditions may become spontaneous under a different set of conditions. In the examples above, the conventional and base-facilitated reformation reactions of the three representative hydrocarbon compounds are non-spontaneous at standard conditions, but can be rendered spontaneous through deviations in one or more reactions conditions relative to standard conditions. Deviations in, for example, reaction temperature, reaction pressure or reactant concentrations relative to standard conditions may render one of the foregoing non-spontaneous reactions spontaneous. The extent of the deviation in one or more reaction conditions depends on the extent to which a reaction is non-spontaneous. Since the conventional reformation reactions of the three hydrocarbons in the above examples are less spontaneous than the corresponding base-facilitated reformation reactions, greater deviations from standard conditions are required to render the conventional reformation reactions spontaneous relative to the deviations required to render the base-facilitated reactions spontaneous. Similarly with respect to the base-facilitated reformation reactions, the reactions (9), (12) and (15) that utilize a higher concentration of base require less extreme deviations from standard conditions to become spontaneous than do the reactions (8), (11), and (14) that utilize a lower concentration of base.

As discussed in the '707 patent and '935 application, an increase in reaction temperature frequently leads to a lowering of the Gibbs free energy of reaction. Reactions that are non-spontaneous at a lower temperature may become spontaneous at a higher temperature. The degree to which the temperature must be raised to transform a non-spontaneous reaction to a spontaneous reaction depends on the Gibbs free energy of reaction at the lower temperature. The lower the Gibbs free energy of a non-spontaneous reaction is, the lesser is the degree to which the temperature must be raised to cause the reaction to become spontaneous. In the n-heptane, n-octane and cyclohexane embodiments presented hereinabove, the conventional reformation reactions (7), (10), and (13) have higher Gibbs free energy of reaction than the corresponding base-facilitated reactions of each compound. As a result, greater increases in temperature relative to the standard state temperature are required to render the conventional reformation reactions spontaneous and lesser increases in temperature relative to the standard state temperature are required to render the base-facilitated reactions spontaneous. The base-facilitated reactions (8), (11), and (14) become spontaneous at lower temperatures than the corresponding conventional reformation reactions (7), (10), and (13); respectively. Similarly, the higher concentration base-facilitated reactions (9), (12), and (15) become spontaneous at lower temperatures than the corresponding lower concentration base-facilitated reactions (8), (11) and (14).

The instant inventors have considered the effect of temperature on the thermodynamic spontaneity of selected conventional and base-facilitated reformation reactions. Reactions (16) and (17) correspond to the conventional and base-facilitated reformation reactions of pentane ($C_5H_{12}$). Both reactions are thermodynamically non-spontaneous at standard conditions and

|  | $\Delta G^0_{rxn}$ (kJ/mol) |
|---|---|
| (16) $C_5H_{12(l)} + 10H_2O_{(l)} \leftrightarrows 16H_{2(g)} + 5CO_{2(g)}$ | 407.9 |
| (17) $C_5H_{12(l)} + 10OH^-_{(aq)} + 5H_2O_{(l)} \leftrightarrows 16H_{2(g)} + 5CO_3^{2-}_{(aq)}$ | 126.4 | become more spontaneous at higher temperatures. The temperature dependence of the Gibbs energy of reaction can be computed using a calculation that accounts for the temperature variation in the enthalpy and entropy changes of the reactions, where the enthalpy and entropy changes can be determined from knowledge of the variation in the heat capacities of the reactants and products present in each reaction. Through such a calculation, the temperature at which a reaction that is non-spontaneous at standard conditions becomes spontaneous can be determined. The instant inventors have completed a temperature dependent thermodynamic calculation of reactions (16) and (17) and have determined that reaction (16) becomes spontaneous at a temperature of 233° C., while reaction (17) becomes spontaneous at a temperature of 150° C. Thus, inclusion of a base lowers the temperature at which hydrogen can be produced spontaneously from pentane.

The foregoing examples demonstrate that base-facilitated reformation reactions of representative hydrocarbons components of gasoline are more spontaneous (less non-spontaneous) than the corresponding conventional reformation reactions of those components. Inclusion of a base is therefore seen to promote the spontaneity of the production of hydrogen from hydrocarbons and to lessen the severity of reaction conditions necessary to render reformation of hydrocarbons spontaneous. Although the foregoing examples illustrate hydrocarbons selected from among the components of gasoline, it is maintained by the instant inventors that the strategy of using a base to facilitate the production of hydrogen through reformation reactions of hydrocarbons according to the instant invention is applicable to hydrocarbons generally and to other fuels such as diesel, bio-diesel or jet fuel and other mixtures of hydrocarbons or mixtures of organic substances generally such as those derived from natural organic feedstocks, including but not limited to petroleum as well as components of the foregoing. The thermodynamic spontaneity analysis indicates generally that hydrocarbon reformation reactions become increasingly more spontaneous as the amount of base in the reaction increases. Conventional reformation reactions having no base present are less spontaneous than base-facilitated reformation reactions having a low concentration of base present are less spontaneous than base-facilitated reformation reactions having a high concentration of base present. As a result, the instant base-facilitated reformation reactions become spontaneous at less extreme reaction conditions (e.g. lower reaction temperatures) than the corresponding conventional reformation reactions.

Additional examples of increased thermodynamic spontaneity of the instant base-facilitated reformation reactions relative to corresponding conventional reformation reactions are now described. Benzene ($C_6H_6$) is an aromatic compound found in many fuels, hydrocarbon mixtures, petroleum distillates etc. The conventional reformation reaction of benzene (18) and a base-facilitated reformation reaction of benzene (19) are given below along with the Gibbs energy of reaction at standard conditions for each reaction. Sodium hydroxide is selected as the base reactant in this example.

|  |  | $\Delta G^0_{rxn}$ (kJ/mol) |
|---|---|---|
| (18) | $C_6H_{6(l)} + 12H_2O_{(l)} \leftrightarrows 15H_{2(g)} + 6CO_{2(g)}$ | 252.71 |
| (19) | $C_6H_{6(l)} + 12NaOH_{(aq)} + 6H_2O_{(l)} \leftrightarrows 15H_{2(g)} + 6Na_2CO_{3(aq)}$ | −33.89 |

Ethylene is an example of an alkene compound and reacts according to a conventional reformation reaction (20) and a base-facilitated reformation reaction (21) using sodium hydroxide as a base reactant as shown below:

|  |  | $\Delta G^0_{rxn}$ (kJ/mol) |
|---|---|---|
| (20) | $C_2H_{4(g)} + 4H_2O_{(l)} \leftrightarrows 6H_{2(g)} + 2CO_{2(g)}$ | 57.74 |
| (21) | $C_2H_{4(g)} + 4NaOH_{(aq)} + 2H_2O_{(l)} \leftrightarrows 6H_{2(g)} + 2Na_2CO_{3(aq)}$ | −38.07 | where the Gibbs energy of reaction at standard conditions is shown for each reaction. As a further example, the conventional (22) and base-facilitated (23) reformation reactions of acetylene may be considered. Acetylene ($C_2H_2$) is an alkyne compound and is representative of alkynes generally in the context of the instant invention. The conventional (22) and base-facilitated (23) reformation reactions of acetylene, along with the standard Gibbs energy of reaction, are given below:

|  |  | $\Delta G^0_{rxn}$ (kJ/mol) |
|---|---|---|
| (22) | $C_2H_{2(g)} + 4H_2O_{(l)} \leftrightarrows 5H_{2(g)} + 2CO_{2(g)}$ | −33.89 |
| (23) | $C_2H_{2(g)} + 4NaOH_{(aq)} + 2H_2O_{(l)} \leftrightarrows 5H_{2(g)} + 2Na_2CO_{3(aq)}$ | −179.08 |

The examples of benzene, ethylene, and acetylene presented hereinabove show in each case that the base-facilitated reformation reaction according to the instant invention is more spontaneous thermodynamically at standard conditions than the corresponding conventional reformation reaction. In the case of ethylene, reactions (20) and (21) show that while the conventional reformation reaction is not spontaneous at standard conditions, the base-facilitated reaction is spontaneous at standard conditions. Ethylene is thus an example of an organic substance whose production of hydrogen is rendered spontaneous at standard conditions through inclusion of a base according to the instant invention. Benzene behaves similarly.

The beneficial result of the instant invention that base-facilitated reformation reactions of an organic substance become spontaneous at lower temperatures than the conventional reformation reaction of the organic substance applies regardless of the phase in which the reactions occur. In the '707 patent, examples of base-facilitated reformation reactions are provided where reformation of an organic substance is possible in the liquid phase in the presence of a base whereas the conventional reformation reaction of the organic substance required steam reformation and reaction in the gas phase. The base-facilitated reformation reactions of many longer chain hydrocarbons (including many of the most abundant hydrocarbons present in gasoline, diesel, other fuels, and petroleum distillates) are sufficiently non-spontaneous at standard conditions that the temperature increase needed to render the reaction spontaneous may be too high to permit spontaneous reaction in the liquid phase. Instead, the necessary temperatures are such that the reactions occur in the gas phase. Embodiments of the instant invention include gas phase base-facilitated reformation reactions as well as liquid phase base-facilitated reformation reactions. Where gas phase reaction conditions are required to render a base-facilitated reformation reaction spontaneous, it remains the case that the temperature necessary to permit spontaneous reaction is lower for the instant base-facilitated reactions than for the corresponding conventional reformation reaction. In other words, the temperature needed to render a base-facilitated steam reformation reaction according to the instant invention spontaneous is lower than the temperature needed to render the corresponding conventional steam reformation reaction spontaneous.

With respect to operation of the instant base-facilitated reactions at higher temperatures, higher temperatures may influence the physical form of the base reactant. As discussed in the '707 patent and '935 application, bases suitable for the instant base-facilitated reactions include hydroxide compounds, which are compounds that provide hydroxide ions. Metal hydroxides are the preferred bases. Representative metal hydroxides include alkali metal hydroxides (e.g. NaOH, KOH etc.) alkaline earth metal hydroxides (e.g. $Ca(OH)_2$, $Mg(OH)_2$, etc.), transition metal hydroxides, posttransition metal hydroxides and rare earth hydroxides. Non-metal hydroxides such as ammonium hydroxide may also be used. At standard state conditions, most hydroxide compounds are solids and are introduced in solution form as reactants in the instant base-facilitated reformation reactions. Aqueous solutions are one preferred solution form of hydroxide compounds. Hydroxide compounds may also form solutions directly with the organic substance that is being reformed in a base-facilitated reformation reaction according to the instant invention. The providing of a hydroxide base in solution form, however, is only possible over a temperature range compatible with a liquid solution phase. At temperatures above the boiling point of a hydroxide base solution, the solution is unstable and the solvent (e.g. water) boils away leaving behind the solid form of the hydroxide base.

The scope of the instant invention further includes embodiments in which the base reactant (e.g. hydroxide compound) is included in the form of a solid in the instant base-facilitated reformation reactions. These embodiments include not only those in which a solid hydroxide compound is soluble in the organic substance undergoing reformation (see the '707 patent for an example in which methanol reformation via KOH in the absence of water is demonstrated), but also those in which the base reactant is in the solid phase and other reactants are in the gas phase. Thus, for example, in order to achieve spontaneity or to generate hydrogen at a desired rate it may be necessary to run a base-facilitated reformation reaction at a temperature higher than that which can sustain a base in a solution phase (e.g. the reaction temperature may be higher than the boiling point of an aqueous solution of a hydroxide compound). In such an embodiment, the water reactant of the instant base-facilitated reformation reactions will be present in the gas phase and the hydroxide compound may be present in the solid phase. Depending on the temperature and the volatility of the organic substance, the organic substance may be in the liquid phase or gas phase. Such multiphase embodiments are within the scope of the instant invention. When contacted with a solid hydroxide compound, gas phase water and the organic substance undergo a surface reaction with the solid hydroxide compound according to instant base-facilitated reformation reactions such as those shown in Table 1 hereinbelow.

At still higher temperatures, the solid phase hydroxide compound may melt to form a molten hydroxide compound. In a further embodiment of the instant invention, the molten state of a hydroxide compound is used as a base reactant in the instant base-facilitated reformation reactions. A molten hydroxide compound contains hydroxide ions that are able to react according to the instant base-facilitated reformation reactions. The instant base-facilitated reformation reactions provide for the reaction of an organic substance with hydroxide ions and water to form hydrogen gas through the formation of a carbonate ion by-product or a bicarbonate ion by-product. The scope of the instant invention includes embodiments in which hydroxide ions are provided in the form of a solution (e.g. aqueous solution, solution in an organic solvent, solution with the organic substance undergoing reformation), solid, or molten state where the organic substance of the reaction is present in the gas phase or liquid phase and the water reactant in the reaction is present in the gas phase or liquid phase.

The instant inventors have completed thermodynamic spontaneity calculations on representative base-facilitated reformation reactions within the scope of the instant invention in which the hydrocarbon is present as a gas phase reactant and/or the base is present in the solid phase. Selected results are presented in Table 1 below. Comparisons with corresponding conventional reformation reactions occurring in the gas phase are provided for comparison. The table includes the Gibbs energy of reaction at standard conditions ($\Delta G^0$) and, for some of the reactions, a temperature $T_s$ that corresponds to the minimum temperature needed for the reaction to become thermodynamically spontaneous.

TABLE 1

| Reaction | $\Delta G^0$ (kcal/mole) | $T_s$ (° C.) |
| --- | --- | --- |
| $C_2H_5OH_{(g)} + 3H_2O_{(g)} \leftrightarrows 2CO_{2(g)} + 6H_{2(g)}$ | +15.5 | 245 |
| $C_2H_5OH_{(g)} + 2NaOH_{(S)} + 3H_2O_{(g)} \leftrightarrows 2NaHCO_{3(S)} + 6H_{2(g)}$ | −21.4 | |
| $C_2H_5OH_{(g)} + 4NaOH_{(S)} + H_2O_{(g)} \leftrightarrows 2Na_2CO_{3(S)} + 6H_{2(g)}$ | −41.8 | |
| $CH_{4(g)} + 2H_2O_{(g)} \leftrightarrows CO_{2(g)} + 4H_{2(g)}$ | +27.1 | 821 |
| $CH_{4(g)} + NaOH_{(S)} + 2H_2O_{(g)} \leftrightarrows NaHCO_{3(s)} + 4H_{2(g)}$ | +8.7 | |
| $CH_{4(g)} + 2NaOH_{(S)} + H_2O_{(g)} \leftrightarrows Na_2CO_{3(S)} + 4H_{2(g)}$ | −1.5 | 2 |
| $C_5H_{12(g)} + 10H_2O_{(g)} \leftrightarrows 5CO_{2(g)} + 16H_{2(g)}$ | +76.8 | 434 |
| $C_5H_{12(g)} + 5NaOH_{(S)} + 10H_2O_{(g)} \leftrightarrows 5NaHCO_{3(S)} + 16H_{2(g)}$ | −15.4 | −15 |
| $C_5H_{12(g)} + 10NaOH_{(S)} + 5H_2O_{(g)} \leftrightarrows 5Na_2CO_{3(s)} + 16H_{2(g)}$ | −66.2 | |
| $C_7H_{16(g)} + 14H_2O_{(g)} \leftrightarrows 7CO_{2(g)} + 22H_{2(g)}$ | +102.7 | 409 |
| $C_7H_{16(g)} + 7NaOH_{(S)} + 14H_2O_{(g)} \leftrightarrows 7NaHCO_{3(S)} + 22H_{2(g)}$ | −26.3 | |
| $C_7H_{16(g)} + 14NaOH_{(S)} + 7H_2O_{(g)} \leftrightarrows 7Na_2CO_{3(S)} + 22H_{2(g)}$ | −97.5 | |
| $C_7H_{16(g)} + 7NaOH_{(aq)} + 14H_2O_{(l)} \leftrightarrows 7NaHCO_{3(aq)} + 22H_{2(g)}$ | +72.7 | 191 |
| $C_7H_{16(g)} + 14NaOH_{(aq)} + 7H_2O_{(l)} \leftrightarrows 7Na_2CO_{3(aq)} + 22H_{2(g)}$ | +38.0 | 144 |

The table indicates that the base-facilitated reactions are more spontaneous and become spontaneous at lower temperatures than the corresponding conventional reformation reactions when the organic substance is present in the gas phase. The table also shows that the instant base facilitated reactions are more spontaneous than the corresponding conventional reformation reactions in the gas phase when a solid phase base is used to facilitate the reaction. For example, the table indicates that the conventional reformation reactions of pentane ($C_5H_{12}$) and heptane ($C_7H_{16}$) in the gas phase are non-spontaneous at standard conditions, but become spontaneous at standard conditions when a solid phase base is included in the reaction.

The foregoing discussion has considered the effect of increasing the temperature on the spontaneity of reformation reactions and has led to the conclusion that the minimum temperature needed to achieve spontaneity is lower for the instant base-facilitated reformation reactions than for the corresponding conventional reformation reaction. The beneficial effect of the base-facilitated reformation reactions of the instant invention may also be viewed in terms of the rate of production of hydrogen at a particular temperature. As indicated hereinabove, an increase in temperature increases the spontaneity of a reaction and may render a non-spontaneous reaction spontaneous. If the temperature is such that a particular reformation reaction (conventional or base-facilitated) is spontaneous, the production of hydrogen gas occurs spontaneously from the reaction.

The rate of production of hydrogen gas is an additional consideration of interest to the instant inventors. It is generally preferred to produce hydrogen gas at the fastest rate possible. In addition to influencing the spontaneity of a reaction, it is generally the case that once a reaction is spontaneous, an increase in temperature increases the rate of a reaction. In the instant reformation reactions, the rate of hydrogen production increases as the temperature of a spontaneous reformation (conventional or base-facilitated) increases. The greater spontaneity of hydrogen production afforded by the instant base-facilitated reformation reactions means that at a particular reaction temperature, the rate of production of hydrogen is higher for a base-facilitated reformation reaction according to the instant invention than for the corresponding conventional reformation reaction. At temperatures at which a base-facilitated reformation reaction of an organic substance is spontaneous and the corresponding conventional reformation reaction is non-spontaneous, the rate of production of hydrogen is, of course, greater for the base-facilitated reaction than for the conventional reformation reaction. Above a certain temperature, the conventional reformation reaction and the instant base-facilitated reformation reactions of an organic substance are all spontaneous. Even at temperatures at which the conventional and base-facilitated reformation reactions are all spontaneous, it remains the case that the instant base-facilitated reformation reactions are more spontaneous than the corresponding conventional reformation reaction. At a particular temperature at which the conventional reformation reaction and the instant base-facilitated reformation reactions of an organic substance are all spontaneous, the rate of production of hydrogen is greater for the base-facilitated reactions than for the conventional reformation reaction. The beneficial effects of including a base in the instant reformation reaction thus include a decrease in the temperature necessary to render a non-spontaneous reformation reaction spontaneous and a greater rate of production of hydrogen relative to the corresponding conventional reformation reaction at a particular reaction temperature due to the greater spontaneity of the instant base-facilitated reactions. The greater rate of hydrogen production provided by the instant base-facilitated reformation reactions relative to the corresponding conventional reformation reactions holds regardless of the phase in which either of the reactions occurs. If, for example, both the base-facilitated reformation reaction of an organic substance occurs in the gas phase (due to a desire to achieve a particular rate of hydrogen production or to the need to achieve spontaneity) and the conventional reformation reaction of the organic substance occurs in the gas phase at a particular temperature, the instant base-facilitated reformation reaction provides a greater rate of hydrogen production than the conventional reformation reaction. An analogous conclusion holds at a particular reaction temperature where the base-facilitated reformation reaction occurs in the liquid phase and the conventional reformation reaction occurs in the gas phase or where both the base-facilitated reformation reaction and conventional reformation reaction occur in the liquid phase.

In a further embodiment of the instant invention, the instant base-facilitated reformation reactions are executed at an elevated reaction pressure. As indicated hereinabove, it may be desirable to increase the reaction temperature in order to increase the rate of production of hydrogen. Frequently, the higher is the reaction temperature, the faster is the reaction rate. Temperatures above a certain point, however, induce a phase transformation of one or more reactants in the instant base-facilitated reformation reactions from the liquid phase to the gas phase. As indicated in the '707 patent, it may be desirable for the hydrogen gas formed in the instant base-facilitated reformation reaction to be the only gas phase component present upon completion or termination of the reaction. It is thus desirable in some embodiments herein to avoid the formation of other gas phase products and to have any unreacted starting materials of the reaction be in the liquid phase. These conditions simplify the recovery of hydrogen gas from the instant base-facilitated reformation reactions and avoid the need and expense associated with the gas phase separation of hydrogen gas from other gaseous species. Consequently, it is preferable in many embodiments herein that the instant base-facilitated reformation reactions occur in the liquid phase and produce only hydrogen as a gas phase product. As indicated hereinabove, temperature provides one reaction variable that can be used to influence the phase in which the instant base-facilitated reformation reactions occur. Completion of a base-facilitated reformation reaction at a sufficiently low temperature insures that the reaction occurs in the liquid phase, that any unreacted starting materials (e.g. the organic substance, water, base) remains in the liquid phase upon completion or termination of the reaction and that hydrogen gas is the only gas phase species present.

In this embodiment of the instant invention, the pressure at which the instant base-facilitated reformation reactions occur is increased to maintain liquid phase conditions for the reaction. Elevation of reaction pressure counteracts the tendency of reactants in the instant base-facilitated reformation reactions to vaporize when the reaction temperature is increased. The boiling point of organic substances is known to increase with increasing pressure. The boiling point of an organic substance at ambient pressure (ca. 1 bar), for example, is lower than the boiling point of the organic substance at elevated pressures (pressures higher than ambient pressure). Thus, by increasing reaction pressure it becomes possible to increase the reaction temperature without inducing vaporization and as a result, the instant base-facilitated reformation reactions can be conducted in the liquid phase at temperatures above the normal boiling point (the boiling temperature at ambient pressure) of one or more of the reactants. The higher liquid phase reaction temperatures are beneficial in that they may provide for a greater rate of production of hydrogen gas from a liquid phase reaction mixture.

An indication of the preferred reaction pressure range can be gleaned from known results for conventional reformation reactions. In a paper entitled "Hydrogen from catalytic reforming of biomass-derived hydrocarbons in liquid water" by R. D. Cortright et al. (Nature, vol. 418, p. 964-967 (2002)), for example, the authors discuss the conventional reformation reactions of selected sugars and alcohols. In these conventional reformation reactions, the sugars and alcohols were reacted with water in conventional reformation reactions to form hydrogen gas and carbon dioxide gas. By conducting the reactions at elevated reaction pressures, the authors were able to conduct the conventional reformation reactions in the aqueous phase at temperatures up to 538 K. The authors presented the organic substances glucose, sorbitol, glycerol, ethylene glycol and methanol as examples and demonstrated aqueous phase conventional reformation reactions of each of the substances at 498 K and 29 bar and at 538 K and 56 bar. Based on the work described for conventional reformation reactions of sugars and alcohols and by considering the particular needs of the instant base-facilitated reformation reactions, the instant inventors maintain that a reaction pressure above 10 bar is a preferred embodiment and that a reaction pressure above 25 bar is a particularly preferred embodiment of the instant base-facilitated reformation reactions of organic substances where it is desired to elevate the reaction temperature (including above the boiling point of one or more reactants) while maintaining liquid phase reaction conditions.

As an example of a reaction that may be induced to occur in the liquid phase through the application of pressure, we can consider the following reformation reaction of pentane:

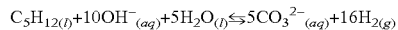

Using the thermodynamic model described hereinabove, the temperature at which the above reaction becomes spontaneous is 150° C. Since this temperature is above the normal boiling temperature of pentane, an increase in the reaction temperature in an attempt to render the reaction spontaneous causes the pentane to vaporize, thereby preventing a liquid phase reaction. In this embodiment of the instant invention, the reaction pressure may be increased to maintain pentane in a liquid phase at 150° C. Thermodynamic data available to persons in the art indicate that the saturation pressure corresponding to a saturation temperature of 150° C. is 16.3 bar. If the reaction pressure is increased to or above 16.3 bar, pentane can be maintained in a liquid state at a temperature of 150° C. and the reformation reaction may occur in the liquid phase.

Elevation of reaction pressure also permits the operation of conventional reformation reactions at higher temperatures. As indicated above, prior art conventional reformation reactions of sugars and alcohols can be run in the liquid phase at higher temperatures when the reaction pressure is increased. Another embodiment of the instant invention includes the operation of conventional reformation reactions of hydrocarbons (straight chain, branched, cyclic) at elevated reaction pressure in order to maintain a liquid phase condition for the reactants. In this embodiment, the reaction pressure is preferably a pressure of at least 10 bar and more preferably a pressure of at least 25 bar.

In a further embodiment of the instant invention, the instant base-facilitated reactions are conducted electrochemically to produce hydrogen from organic substances including hydrocarbons and oxygenated hydrocarbons. As described in the parent '935 application, inclusion of a base in a reformation reaction reduces the electrochemical potential (voltage) required to effect the production of hydrogen from an organic substance relative to the production of hydrogen from the corresponding conventional electrochemical reformation reaction. The instant invention further includes electrochemical reactions in accordance with the parent '935 application as applied to the reformation of organic substances or mixtures thereof described herein. In these embodiments, an organic substance or mixture thereof and a base are placed in an electrochemical cell having an anode and a cathode and a voltage is applied between the anode and cathode to effect the electrolytic production of hydrogen from the organic substance or mixture thereof in an electrochemical reaction in accordance with the '935 application. In a preferred embodiment, water is included along with the organic substance or mixture thereof and base in the electrochemical cell.

In yet another embodiment of the instant invention, the instant base-facilitated reformation reactions are conducted in combination with the carbonate or bicarbonate recovery reactions discussed in the co-pending parent '093 application. The carbonate or bicarbonate recovery reactions are intended to improve the overall efficiency of the production of hydrogen from organic substances and mixtures thereof. As indicated hereinabove, in the embodiments of the instant base-facilitated reformation reaction, carbonate ion or bicarbonate ion is produced as a by-product of the reaction. The carbonate ion or bicarbonate ion is a side product that needs to be discarded or otherwise dispensed with. In order to improve the efficiency of hydrogen production, it is desirable to recycle or otherwise utilize the carbonate ion or bicarbonate ion by-product. The '093 application discusses recovery reactions that may be used to recycle carbonate ion or bicarbonate ion by-products. Various reactions are discussed depending on the form of the carbonate ion or bicarbonate ion formed in the instant base-facilitated reaction. As an example, if a carbonate ion by-product is formed as a metal carbonate precipitate, this precipitate can be collected and thermally decomposed to obtain a metal oxide. This metal oxide can subsequently be reacted with water to form a metal hydroxide that can be returned as a base reactant to the instant base-facilitated reformation reaction. As another example, if a carbonate ion by-product is formed as a metal carbonate that is soluble in the reaction mixture, further reaction with a metal hydroxide may occur where the metal hydroxide is selected so that the carbonate salt of its metal has a low solubility (low $K_{sp}$) so that a metathesis reaction occurs to precipitate out a metal carbonate while leaving behind a soluble metal hydroxide that can be used as a base reactant in further runs of the instant base-facilitated reformation reactions. Bicarbonate ion by-products may be similarly re-utilized. The method of producing hydrogen gas through the instant base-facilitated reformation reactions may thus optionally include additional steps directed at the recycling, conversion or re-utilization of carbonate ion or bicarbonate ion by-products in accordance with the '093 application.

The foregoing discussion and description are not meant to be limitations upon the practice of the present invention, but rather illustrative thereof. It is to be appreciated by persons of skill in the art that numerous equivalents of the illustrative embodiments disclosed herein exist. It is the following claims, including all equivalents and obvious variations thereof, in combination with the foregoing disclosure which define the scope of the invention.

We claim:

1. A process for producing hydrogen gas comprising the step of reacting an organic substance with a base and optionally water to form said hydrogen gas along with a carbonate and/or a bicarbonate by-product, wherein said organic substance includes four or more carbon atoms per molecule.

2. The process of claim 1, wherein said organic substance is a hydrocarbon.

3. The process of claim 1, wherein said organic substance is an oxygenated hydrocarbon.

4. The process of claim wherein said organic substance is a branched compound.

5. The process of claim 1, wherein said organic substance is a cyclic compound.

6. The process of claim 1, wherein said organic substance is an aromatic compound.

7. The process of claim 1, wherein said organic substance is a component of gasoline.

8. The process of claim 1, wherein said organic substance is a component of diesel or bio-diesel.

9. The process of claim 1, wherein said organic substance is a component of petroleum.

10. The process of claim 1, wherein said organic substance is pentane, hexane, heptane, octane or dodecane.

11. The process of claim 9, wherein said aromatic organic substance is benzene or a substituted benzene compound.

12. The process of claim 1, wherein said organic substance is an alkene or an alkyne.

13. The process of claim 1, wherein said organic substance includes five or more carbon atoms per molecule.

14. The process of claim 1, wherein said organic substance includes six or more carbon atoms per molecule.

15. The process of claim 1, wherein said base comprises a hydroxide compound.

16. The process of claim 15, wherein said hydroxide compound is a metal hydroxide compound.

17. The process of claim 16, wherein said metal hydroxide compound is an alkali metal hydroxide compound.

18. The process of claim 1, wherein said base is in a solid or molten state.

19. The process of claim 1, wherein said water is in the form of steam.

20. The process of claim 1, wherein said organic substance is in the gas phase.

21. The process of claim 1, wherein said carbonate is formed in the form of a metal carbonate compound.

22. The process of claim 21, further including the step of reacting said metal carbonate compound with a metal hydroxide compound.

23. The process of claim 21, wherein said metal carbonate compound is formed as a precipitate.

24. The process of claim 23, further including the step of thermally decomposing said metal carbonate precipitate, said thermal decomposition step producing a metal oxide.

25. The process of claim 1, wherein said reaction occurs in the liquid phase.

26. The process of claim 1, wherein said reaction is an electrochemical reaction.

27. The process of claim 1, wherein said reaction occurs at a pressure greater than ambient pressure.

28. The process of claim 1, wherein said reaction occurs at a pressure greater than 10 bar.

29. The process of claim 1, wherein said reaction occurs at a pressure greater than 25 bar.

30. The process of claim 1, wherein the minimum temperature at which said reaction is spontaneous is less than the minimum temperature at which the conventional reformation reaction of said organic substance is spontaneous, said conventional reformation reaction of said organic substance being a reaction of said organic substance with water or steam to form hydrogen gas and carbon dioxide.

31. The process of claim 1, wherein the rate of production of hydrogen gas from said reaction of said organic substance at a desired temperature above the minimum temperature at which said reaction is spontaneous is greater than the rate of production of hydrogen gas from the conventional reformation reaction of said organic substance at said desired temperature, said conventional reformation reaction of said organic substance being a reaction of said organic substance with water or steam to form hydrogen gas and carbon dioxide.

32. The process of claim 1, further comprising the step of reacting one or more additional organic substances with said base and said water to form said hydrogen gas.

33. The process of claim 1, wherein said organic substance comprises a mixture of two or more organic substances.

34. The process of claim 33, wherein said mixture of organic substances includes two or more hydrocarbons.

35. The process of claim 33, wherein said mixture of organic substances includes two or more oxygenated hydrocarbons.

36. The process of claim 33, wherein said mixture of organic substances includes a hydrocarbon and an oxygenated hydrocarbon.

37. The process of claim 33, wherein said mixture of organic substances is a petroleum distillate.

38. The process of claim 33, wherein said mixture of organic substances is gasoline or a distillate thereof, diesel or a distillate thereof, or kerosene or a distillate thereof.

39. A process for producing hydrogen gas comprising the step of reacting an organic substance which includes four or more carbon atoms per molecule with a base and optionally water to form said hydrogen gas without any substantial production of carbon dioxide or carbon monoxide.

40. The process of claims 39, wherein said hydrogen is the only gaseous product of said step of reading.

* * * * *